United States Patent [19]

Albrecht et al.

[11] Patent Number: 4,489,632
[45] Date of Patent: Dec. 25, 1984

[54] WAFFLE SANDWICH SAWING MACHINE

[75] Inventors: Robert J. Albrecht, River Edge; Daniel Ignatuk, Morris Plains, both of N.J.; Albert A. Pinto, White Plains, N.Y.; William J. Simelunas, Glen Rock, N.J.

[73] Assignee: Nabisco Brands, Inc., Parsippany, N.J.

[21] Appl. No.: 402,167

[22] Filed: Jul. 26, 1982

[51] Int. Cl.³ .......................... B26D 1/11; B26D 11/00
[52] U.S. Cl. ...................................... 83/404.2; 83/408; 83/435.2; 83/437; 83/751
[58] Field of Search ................... 83/408, 404.2, 435.2, 83/437, 751, 423

[56] References Cited

U.S. PATENT DOCUMENTS

| 2,964,074 | 12/1960 | Brown | 83/435.2 |
| 3,990,336 | 11/1976 | Soodalter | 83/404.2 |
| 4,005,625 | 2/1977 | Brochu et al. | 83/435.2 |
| 4,046,042 | 9/1977 | Payeur | 83/435.2 |
| 4,308,778 | 1/1982 | Takahashi | 83/751 |
| 4,359,920 | 11/1982 | Haas et al. | 83/404.2 |

Primary Examiner—Donald R. Schran
Attorney, Agent, or Firm—Richard Kornutik

[57] ABSTRACT

A waffle creme sandwich sawing machine having first and second saw mechanisms, each including a row of vertical reciprocating blades. The saw mechanisms are spaced from each other and positioned so their cut lines are at right angles. A pusher mechanism moves a stack of waffle creme sandwich sheets through the first saw mechanism and onto a longitudinally slotted conveyor which moves through said second saw mechanism.

16 Claims, 15 Drawing Figures

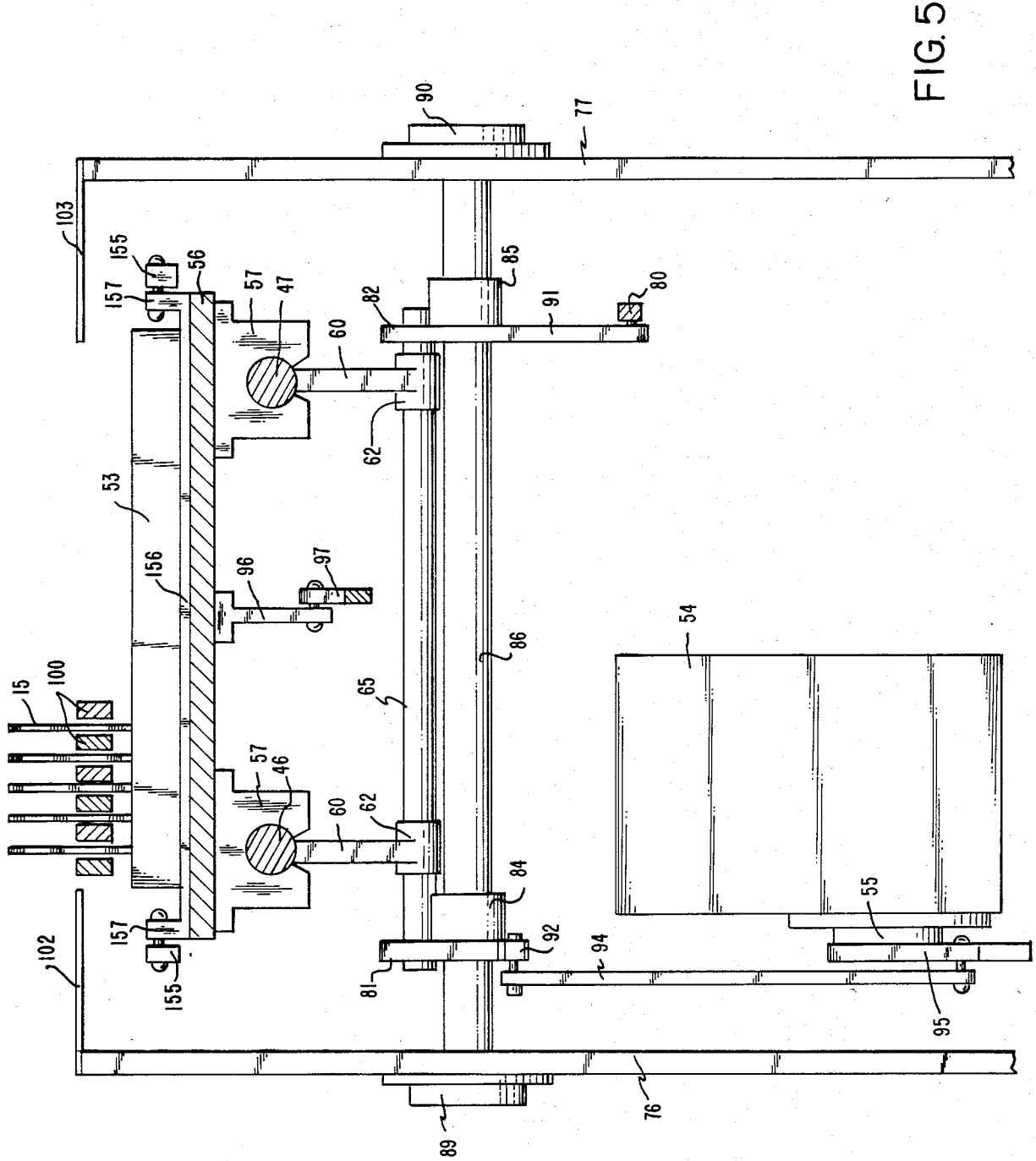

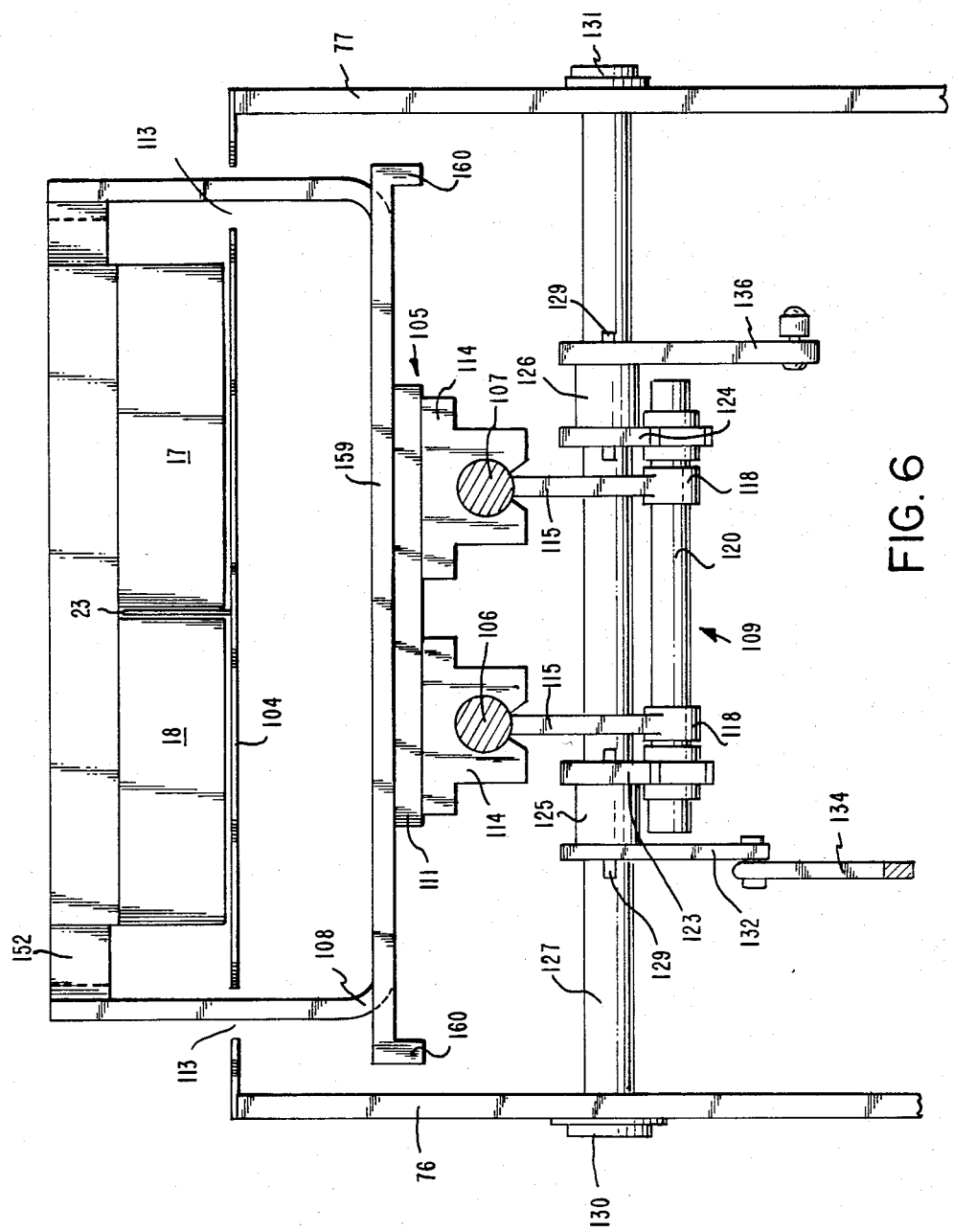

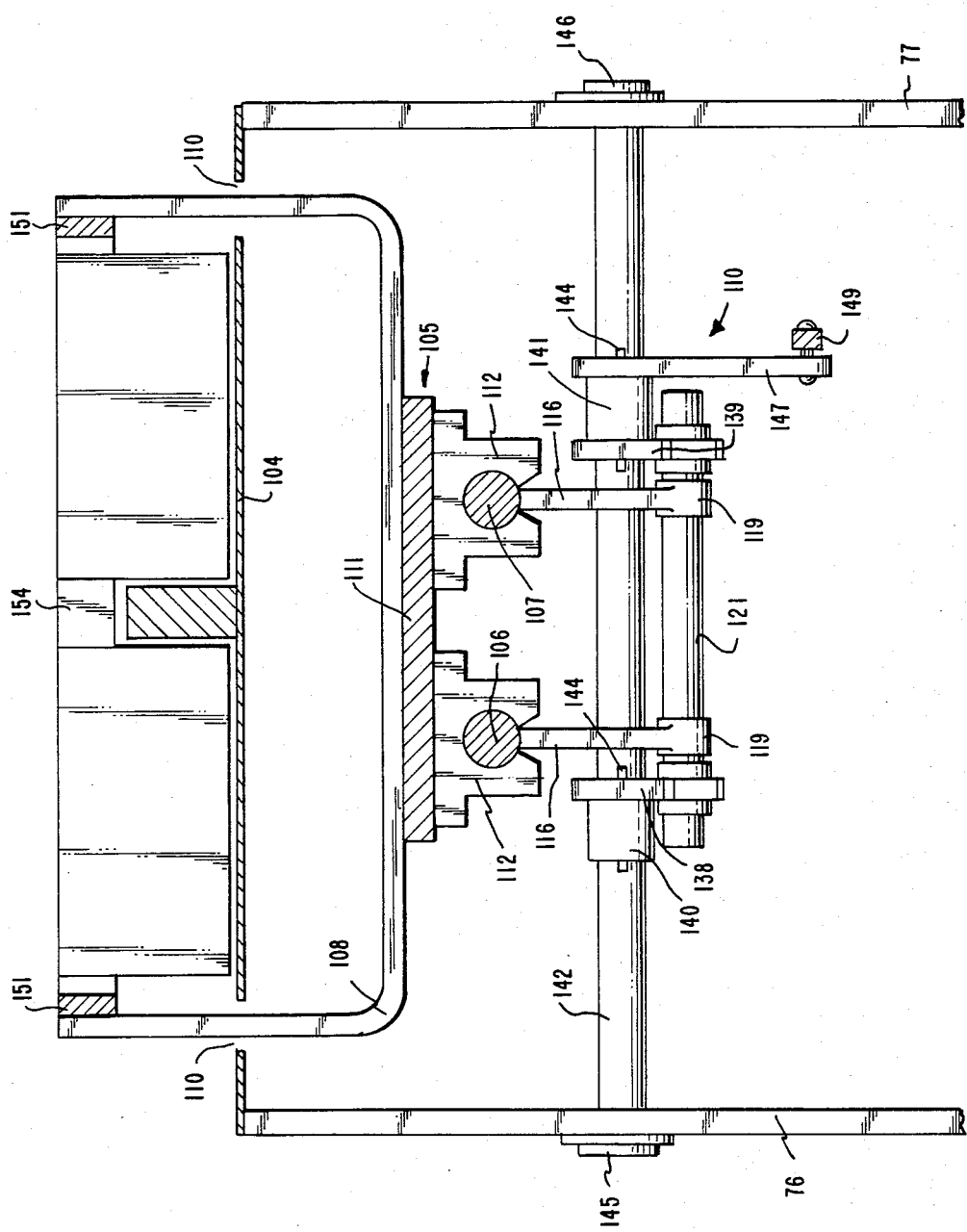

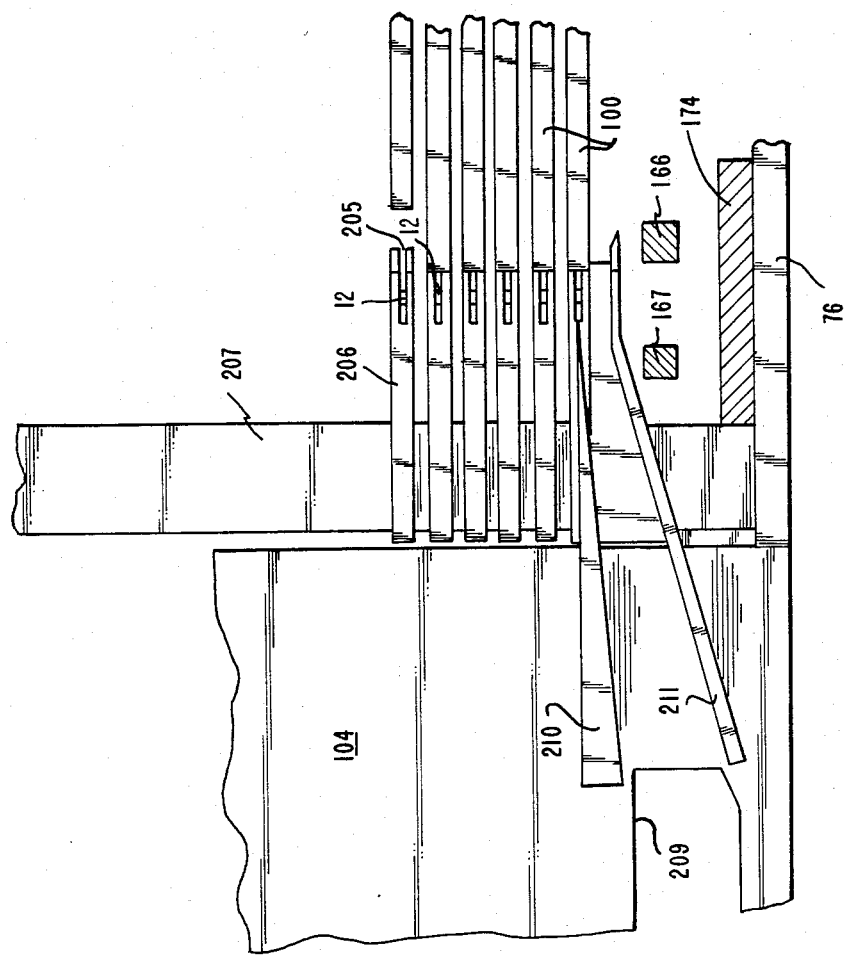

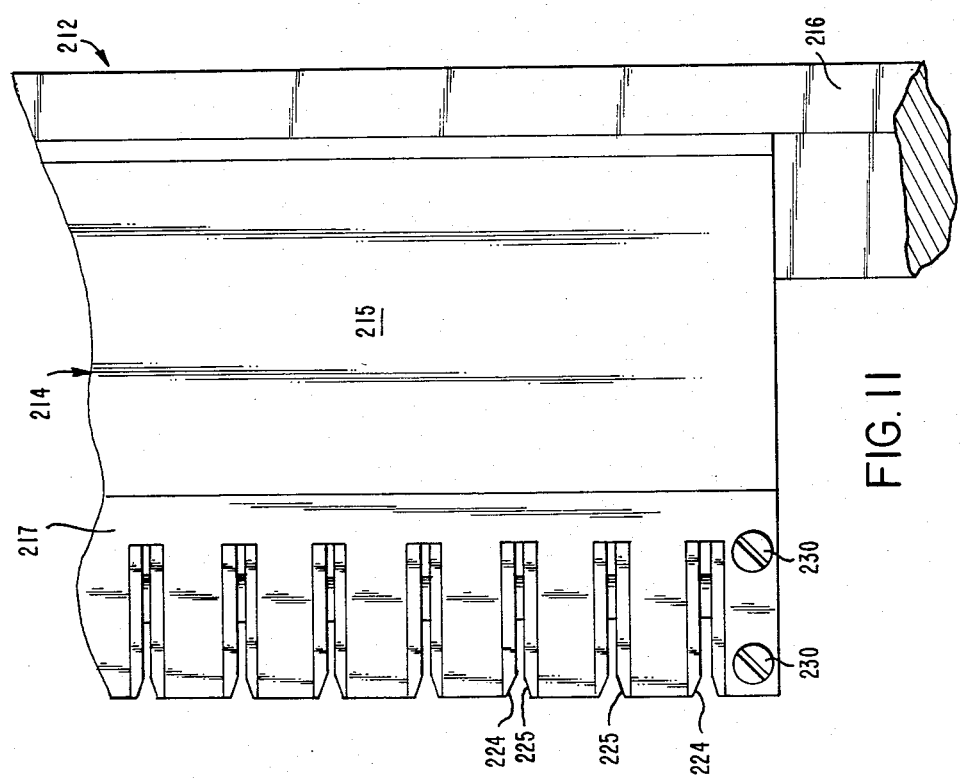
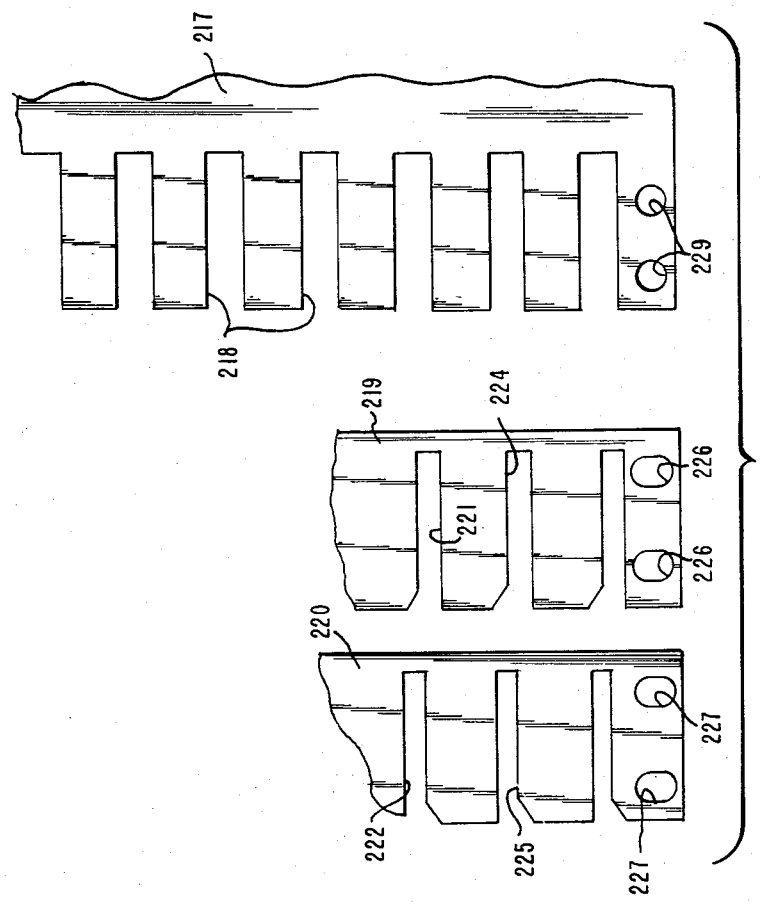

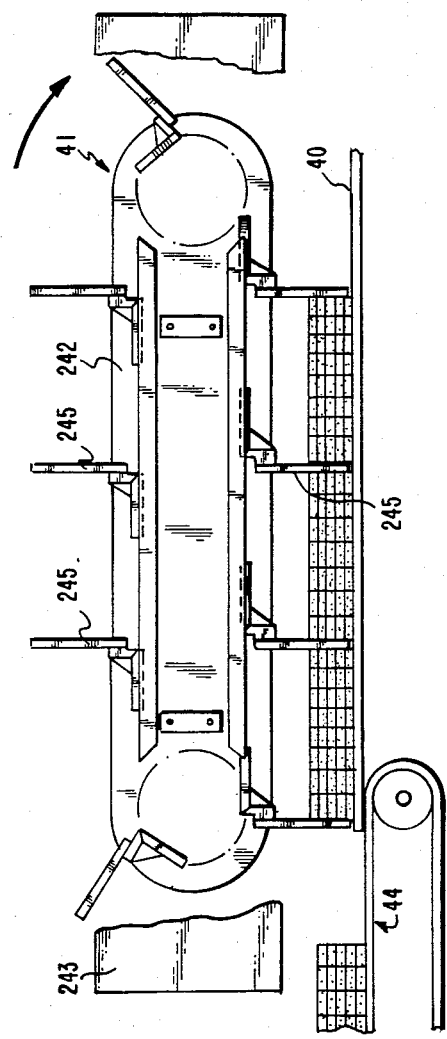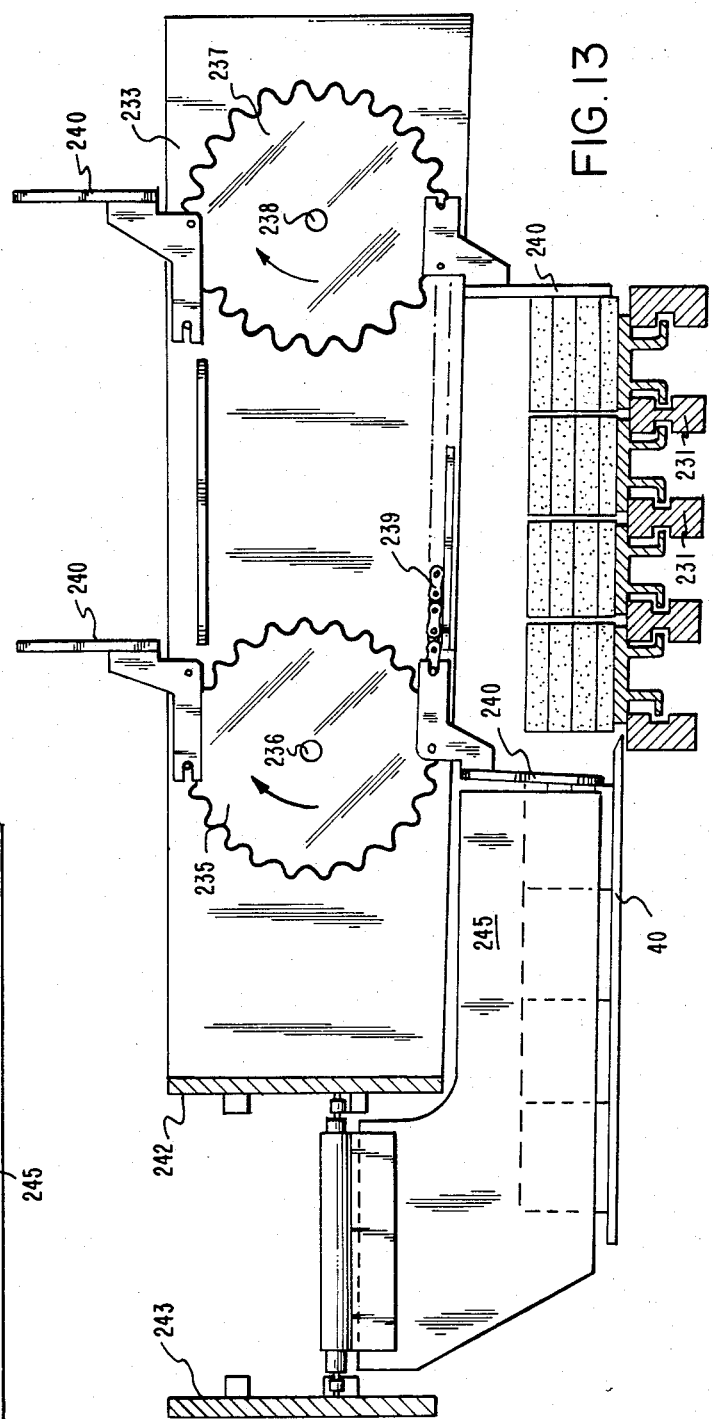

WAFFLE SANDWICH SAWING MACHINE

BACKGROUND OF THE INVENTION

The present invention relates to sawing machines, and, more particularly, to machines for sawing large baked waffle sheets into individual size servings.

The invention related most particularly to a sandwich product known as waffle cremes. This product is conventionally manufactured by baking large waffle sheets, coating such sheets with a layer of icing, adding a second sheet to form a sandwich sheet of about 11 by 18 inches, and sawing the sandwich sheets into stick-like pieces.

The large sandwich sheets are conventionally cut into pieces by first passing them through a set of circular saws to produce strips. The strips are transferred to a second set of circular saws which divide the strips into individual pieces. The stick-like pieces are then manually assembled into package-sized groups with considerable labor expense.

The individual waffle sheets are baked in large waffle iron devices from a liquid batter which is deposited onto one plate of the open iron by a series of nozzles. The edge of each waffle sheet is frequently uneven and, therefore, each set of saws includes end saws for trimming the edges of the sheets. When variations occur in the amount or consistancy of the batter delivered, the irregularity of the edge can extend into the edge rows of the product pieces. This requires that these edge rows of product be discarded. The prior art cutting system typically generated scrap at an average rate of about 20% (including the saw kerf material) of the total sheet.

The circular saw blades used in the prior art cutting system typically produced a kerf of 0.045 to 0.055 inch. The 11×18 inch sandwich sheet is typically divided during the first cut by 19 cut lines into 18 product strips and two trim strips. The total kerf width on the first cut therefore is between 0.855 and 1.045 inches. It was recognized that a significant reduction in kerf width would permit closer spacing of the saw blades, resulting in an increase in the width of the trim strips. With wider trim stipis, fewer edge irregularities would intrude into the product pieces and scrap would be reduced.

It was also desired to reduce handling of the product pieces by stacking several waffle sandwich sheets so that fractional portions of the cut stack would comprise the desired package-size groups. This would aggravate the waste problem of the prior art cutting system because it would require that the diameter of the saw blades be increased, which would increase their flexibility. The more flexible blades would vibrate from side-to-side, producing a wider kerf and requiring that the saw spacing be increased to maintain the piece size. Reducing the flexibility of the blade by increasing its thickness produces the same result.

SUMMARY OF THE INVENTION

It is an object of the present invention to provide apparatus for sawing a stack of large baked sheets with reduced production of scrap into pieces which are arranged in package-sized groups.

The object of the present invention is accomplished by providing in combination first and second saw mechanisms, each including a row of vertical reciprocating blades, the saw mechanisms being spaced from each other and having their blade rows positioned at right angles to each other, a pusher mechanism for moving a stack of sheets through the first saw mechanism and into the path of second pusher means, the second pusher means carrying the sheets through the second saw mechanism.

BRIEF DESCRIPTION OF THE DRAWINGS

A preferred embodiment of the invention has been chosen for purposes of illustration and description, and is shown in the accompanying drawings, forming a part of the specification, wherein:

FIG. 1A is an enlarged view of a portion of FIG. 1.

FIG. 5 is a transverse sectional elevation taken along line 5—5 on FIG. 2, FIG. 6 is a transverse sectional elevation taken along line 6—6 on FIG. 3, FIG. 7 is a transverse sectional elevation taken along line 7—7 on FIG. 3, FIG. 10 is a sectional plan view taken along line 10—10 on FIG. 8, FIG. 11 is a plan view taken along line 11—11 on FIG. 8 disclosing a device for dampening saw blade vibration, FIG. 12 is a plan view illustrating the construction of the device of FIG. 11, FIG. 13 is a sectional elevation taken along line 13—13 on FIG. 1, and FIG. 14 is a sectional elevation taken along line 14—14 on FIG. 1.

DESCRIPTION OF THE PREFERRED EMBODIMENT

Figure 1:
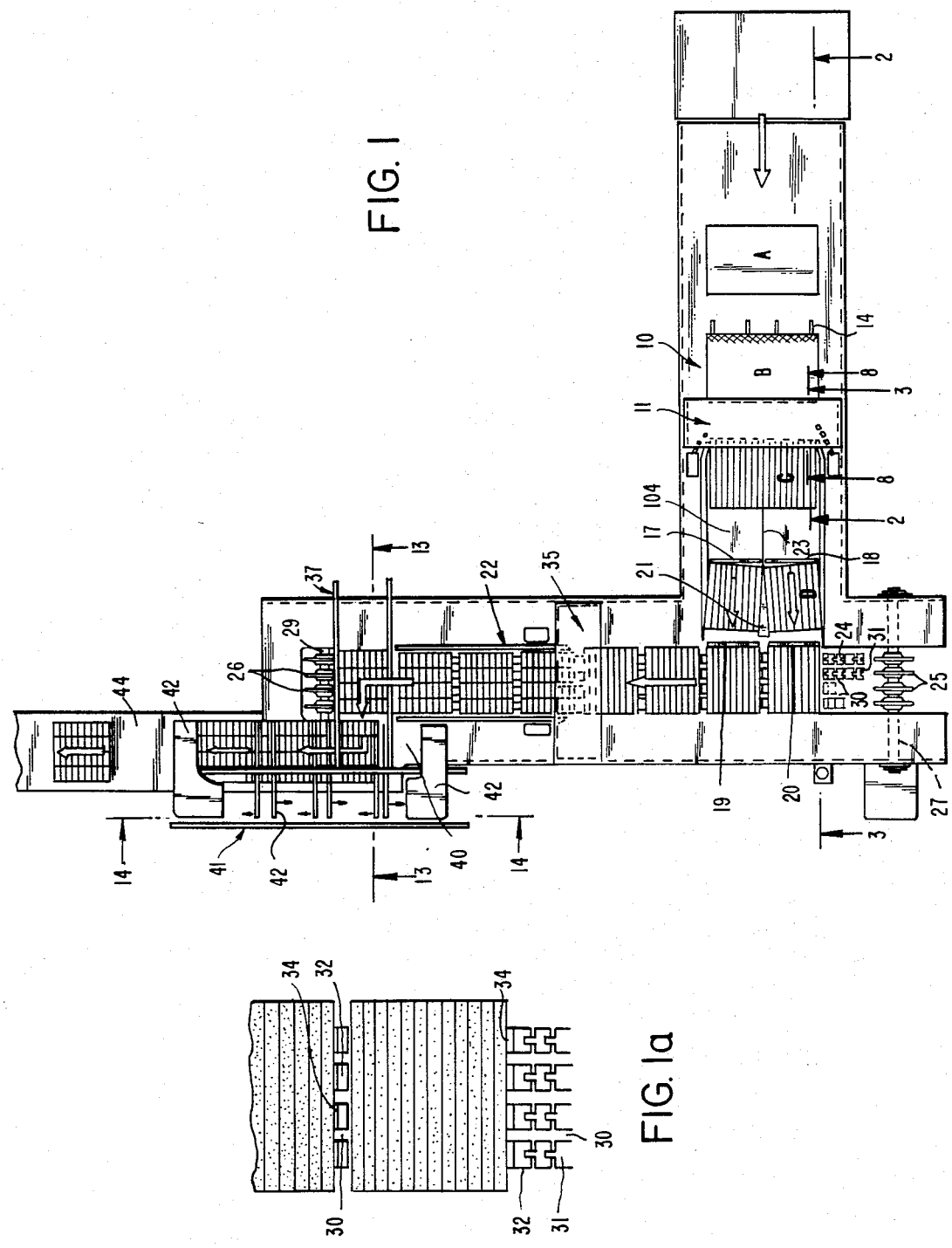
FIG. 1 is a plan view of a sawing machine according to the present invention.

Referring to the drawings in detail, there is shown a machine according to the present invention, the general layout of which is shown in FIG. 1. The machine includes an elongated table 10 equipped with a first saw mechanism 11 in which a row of nineteen vertical reciprocating saw blades 12 (FIGS. 2, 3, 8, and 9) extend across the center of the table. Four waffle creme sandwich sheets having dimensions of about 11 by 18 inches are stacked on the table forming a stack that is 2.25 inches high. A pushing mechanism 13 (FIGS. 2, 4, and 5) beneath the table 10 operates two sets of pusher fingers 14 and 15 for moving the stack of product sheets through the saw mechanism 11. A second pushing mechanism 16 (FIGS. 3, 6, and 7) beneath the table 10 operates pusher plates 17, 18 and 19, 20 to move the stack along the table and past a dividing wedge 21 onto a conveyor 22. A thin dividing wall 23 extends from the leading edge of the wedge 21 to a point just behind the center blade of the saw mechanism 11. As the product sheet stack moves through the saw, the wall 23 enters the kerf of the center blade and divides the stack into two substacks. The dividing wedge 21 moves the substacks laterally to provide the proper spacing for feeding onto the conveyor 22.

The conveyor 22 comprises four parallel conveyor segments 24, each extending between a sprocket 25, at one end and a sprocket 26 at the other end. The sprockets 25 are mounted side by side on a driven shaft 27. The sprockets 26 are similarly mounted on a shaft 29. Adjacent conveyor segments 24 are laterally spaced from each other to provide longitudinally extending gaps 30 therebetween. The conveyor segments 24 are formed of a series of elements 31 which are interconnected by pivot pins, each element being shaped to intermesh with the teeth of the sprockets in the conventional manner. At periodic intervals, pusher elements formed with a perpendicular pushing plate 34, are inserted into the conveyor segments as shown in FIG. 1A.

A second saw mechanism 35 is positioned across the center of the conveyor 22. The saw mechanism includes five vertical reciprocating saw blades, three positioned in the gaps 30, the other two at the outer edges of the conveyor 22. The saw mechanism 35 divides the sawn substacks into four package-size groups, each group being about 2.7 inches wide and 8.6 inches long. Each package size group includes 9 stacks of pieces, each stack being 4 pieces high, and each piece being about 2.5 inches long and 0.94 inches wide.

At the output end of the conveyor 22, an overhead conveyor 37 having pusher plates 39 slides the sawed product onto a dead plate 40. A second overhead conveyor 41 having pusher plates 42 slides the product off the dead plate onto a conveyor belt 44 for delivery to a packaging operation.

Figure 2:
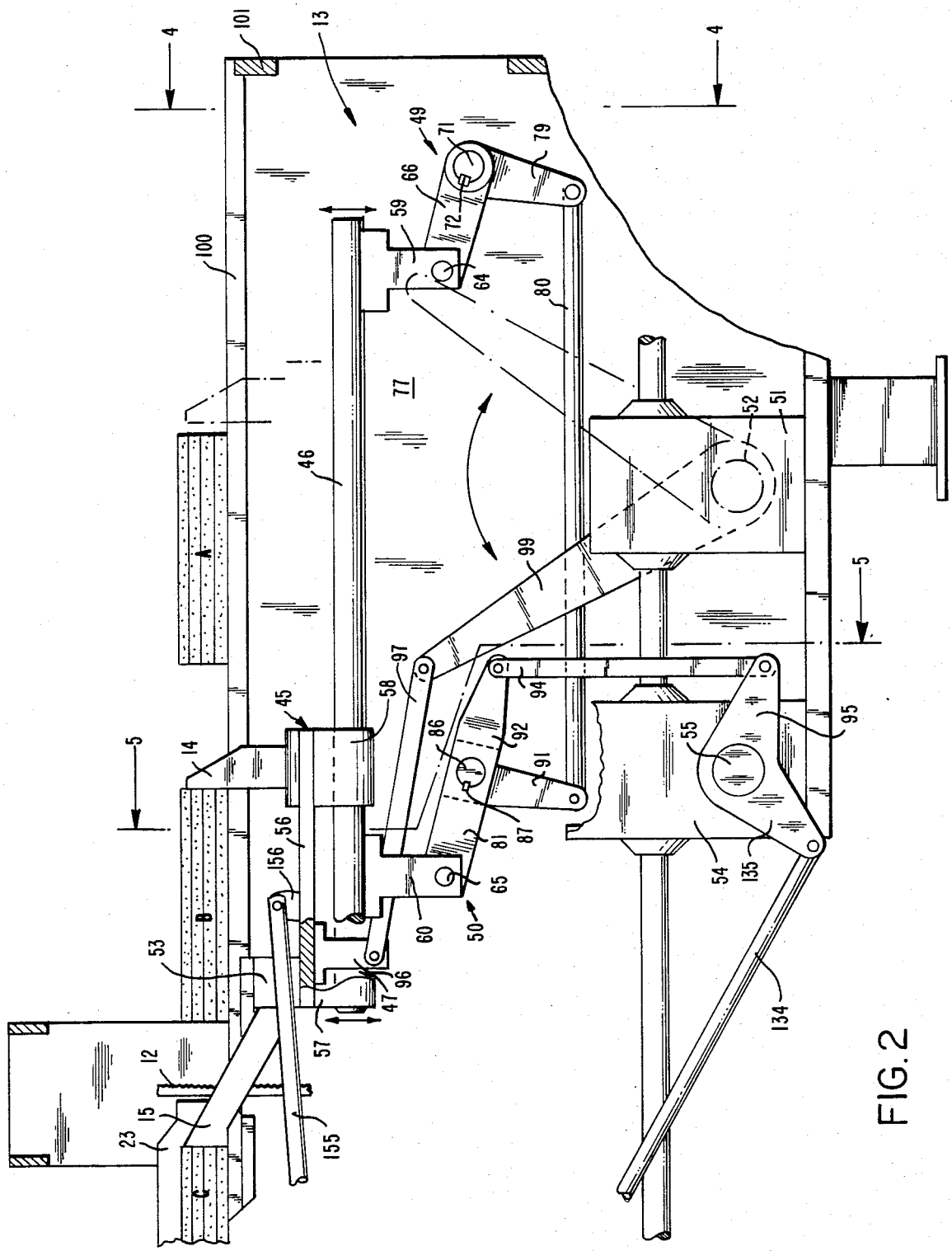
FIG. 2 is a longitudinal sectional elevation taken along line 2—2 on FIG. 1 disclosing a first pushing mechanism.
Figure 4:
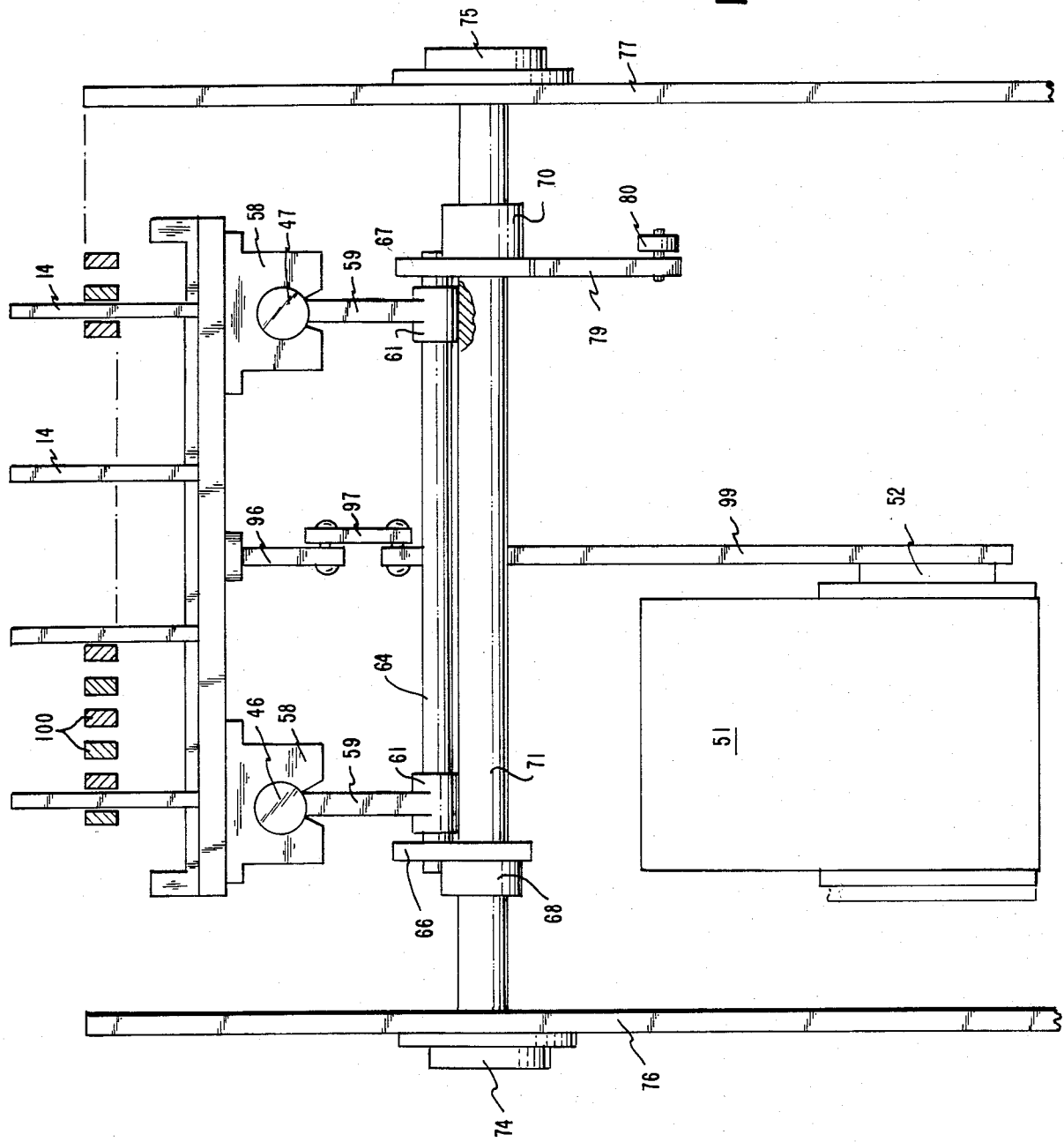
FIG. 4 is a transverse sectional elevation taken along line 4—4 on FIG. 2.
Figure 9:
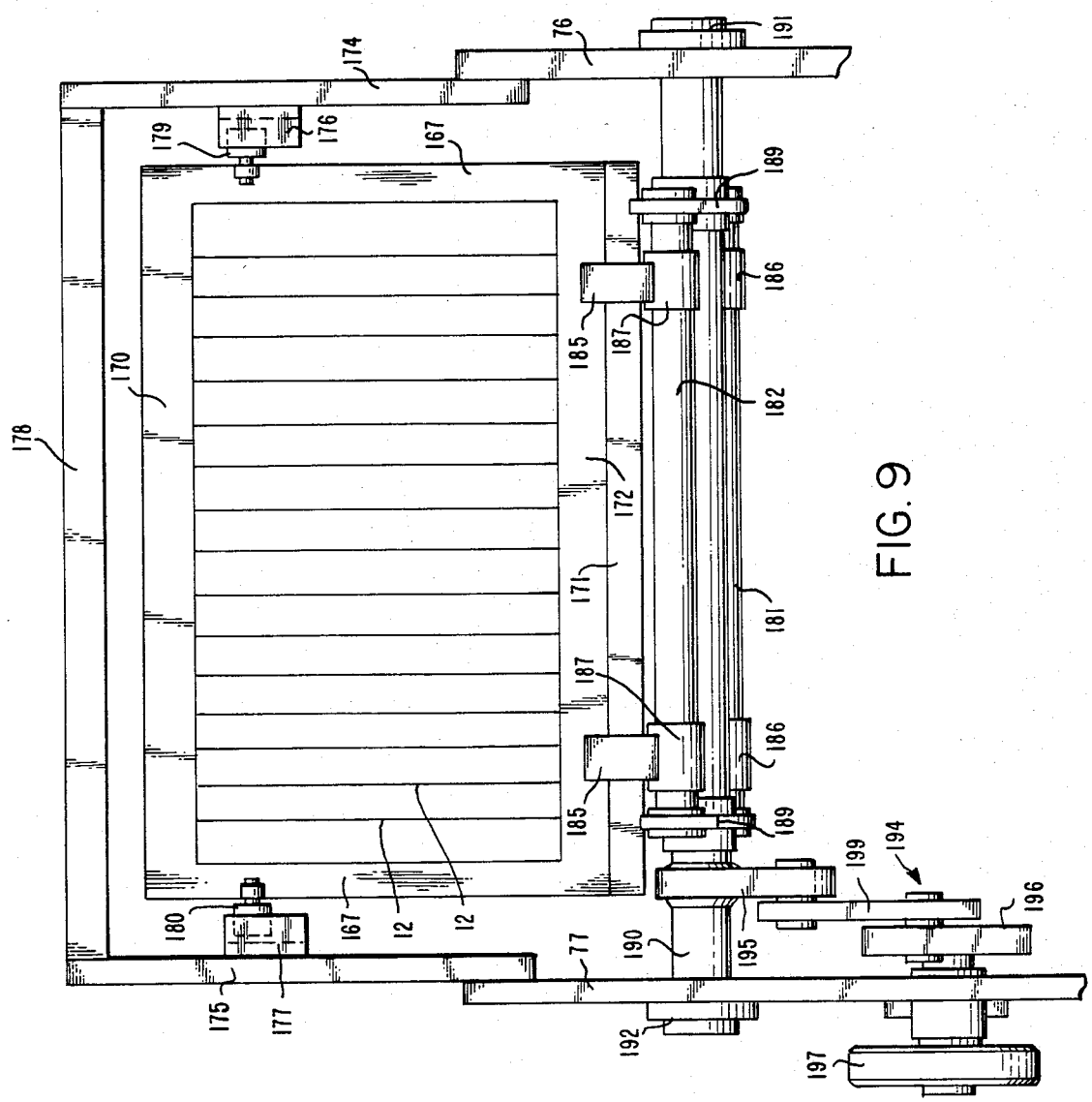
FIG. 9 is a transverse elevational view taken along line 9—9 on FIG. 8.

Referring to FIGS. 2, 4, and 5, the pusher mechanism 13 comprises a carriage 45 mounted on a pair of rods 46 and 47, a pair of rod elevating mechanisms 49 and 50, a first cam mechanism 51 having an oscillating output shaft 52 for driving the carriage 45 along the rack, and a second cam mechanism 54 having an oscillating output shaft 55 for operating the rod elevating mechanisms 49 and 50.

The carriage 45 comprises a plate 56 mounted on a pair of forward bearing blocks 57 and a pair of rear bearing blocks 58. The bearing blocks are slidably mounted on the rods 46 and 47. The pusher fingers 14 are screwed to the rear end of the plate 56 while the fingers 15 are screwed to a bar 53 mounted on the forward end of the plate 56. Support brackets 59 and 60 are screwed to the surface of the rods near the opposite ends thereof. The bottom walls of the bearing blocks 57 and 58 are open to allow the blocks to move by the support brackets. The brackets 59, 60 are provided with journals 61, 62 at the lower end thereof to pivotally receive the shafts 64 and 65, respectively, of the rod elevating mechanisms 49 and 50. The shaft 64 of mechanism 49 is pivotally supported at each end by lever arms 66 and 67. The lever arms 66, 67 are formed with hubs 68, 70, respectively, which are mounted on a shaft 71. The hubs 68, 70 are locked to the shaft 71 by keys 72 (one of which is shown in FIG. 2) positioned in appropriate keyways provided in the shaft and the hubs. The shaft 71 is journaled in bearings 74, 75 mounted in frame plates 76, 77 of the machine. The hub 70 carries a second lever arm 79 which is connected to the rod elevating mechanism 50 by a rod 80.

In the rod elevating mechanism 50 the shaft 65 is pivotally supported at each end by lever arms 81 and 82. The lever arms 81 and 82 are formed with hubs 84 and 85, respectively, which are mounted on a shaft 86. The hubs 84 and 85 are locked to the shaft 86 by keys 87 (one only shown in FIG. 2) positioned in appropriate keyways provided in shaft and the hubs. The shaft 86 is journaled in bearings 89 and 90 mounted in the frame plates 76 and 77.

The hub 85 carries a second lever arm 91 to which the rod 80, extending from the mechanism 49, is connected. The hub 84 is also provided with a second lever arm 92. The arm 92 is connected by means of a rod 94 to an arm 95 mounted on the oscillating shaft 55.

Rotation of the shaft 55 rotates the shaft 86 through the arms 95 and 92. The rotation of shaft 86 causes the simultaneous rotation of the shaft 71 through the lever arms 91 and 79. The movement of the arms 81, 82 and 66, 67 by the simultaneous rotation of the shafts 86 and 71, simultaneously raises or lowers the shafts 65 and 64 to raise or lower the rods 46 and 47.

To move the carriage 45 along the rails 46 and 47, the carriage is provided with a flange 96 fastened to the bottom of the plate 56 between the two forward bearing blocks 57. The flange 96 is connected by means of a linkage rod 97 to an arm 99 which is mounted on the oscillating shaft 52.

Figure 8:
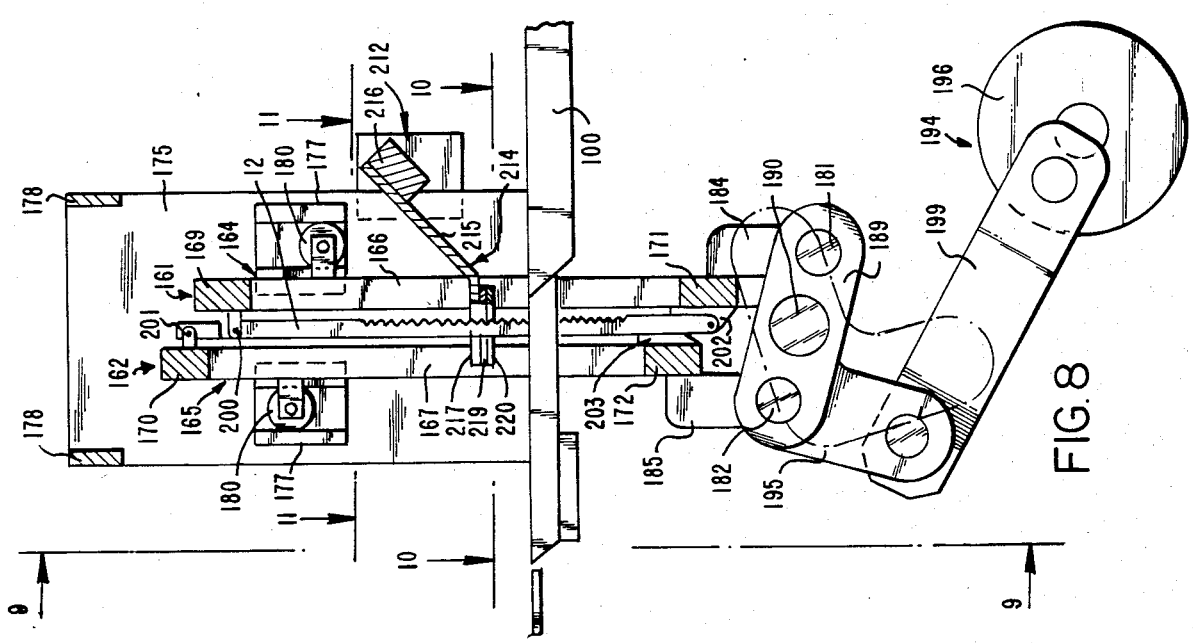
FIG. 8 is a longitudinal sectional elevation taken along line 8—8 on FIG. 1, disclosing one saw mechanism.

As shown in FIGS. 2, 4, and 5, the table 10 is slotted from the input end to the saw mechanism 11. The top of this portion of the table 10 is constructed of a plurality of parallel, spaced rails 100 extending from a cross bar 101 up to the saw blades 12 (as shown in FIGS. 8 and 10). As shown in FIG. 5, metal plates 102, 103 are welded to the frame plates 76, 77 and extend inwardly toward the rails 100.

The pusher fingers 14 and 15 are positioned to pass between the rails 100 when the carriage 45 is lifted by the operation of the rod-elevating mechanisms 49 and 50. When the carriage 45 is moved forward on the rods 46, 47, the fingers 14 and 15 move longitudinally along the rails 100 to engage the product stacks and slide them along the rails 100 toward and past the saw mechanism.

Figure 3:
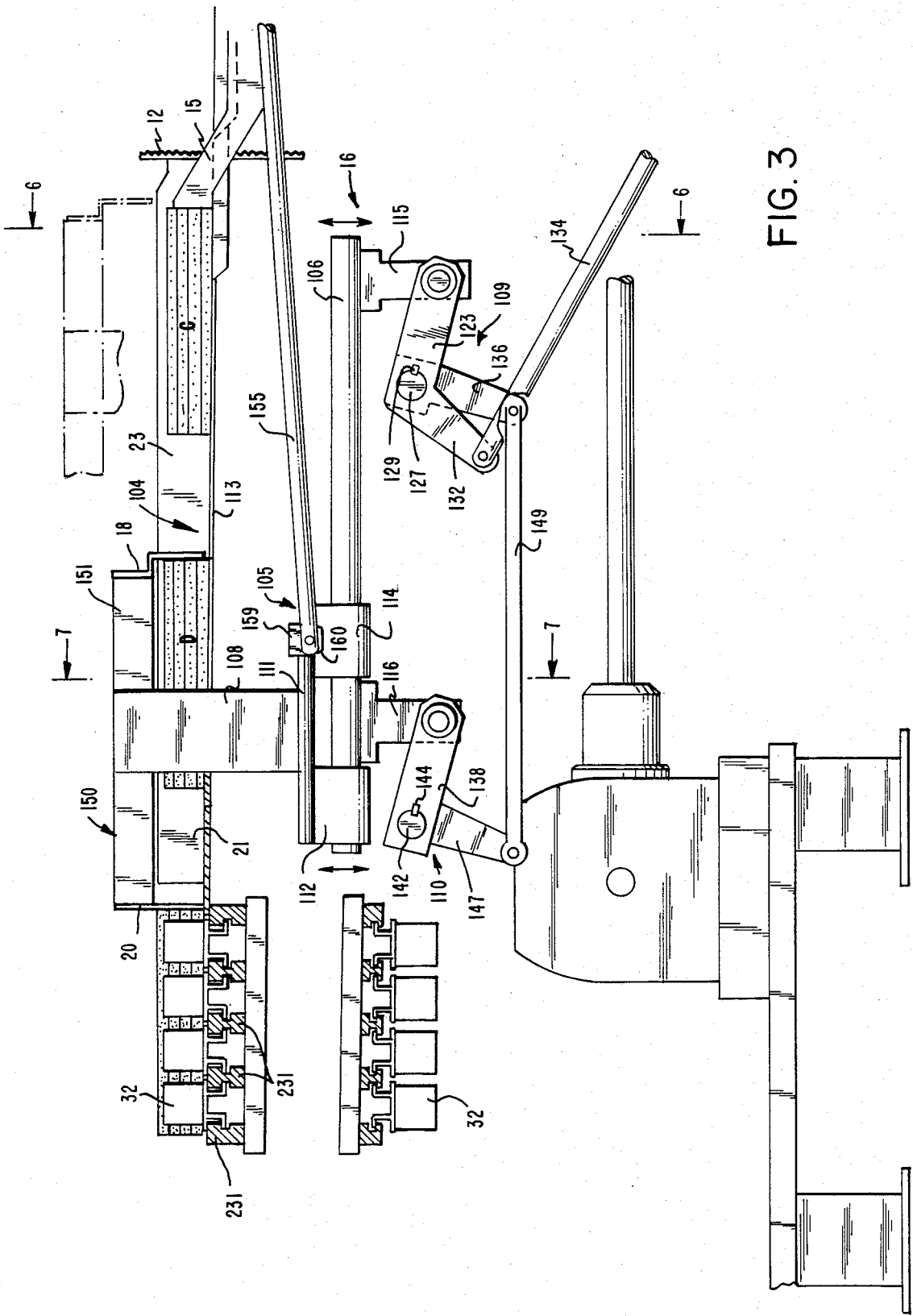
FIG. 3 is a longitudinal sectional elevation taken along line 3—3 on FIG. 1, disclosing a second pushing mechanism.

Referring to FIGS. 3, 6, and 7, the second pushing mechanism 16 is positioned beneath a sheet metal table top surface 104. The mechanism 16 comprises a carriage 105 mounted on a pair of parallel rods 106 and 107, and a pair of rod elevating mechanisms 109, 110.

The carriage 105 comprises a plate 111 mounted on a pair of forward-bearing blocks 112 and a pair of rear bearing blocks 114. The bearing blocks are slidably mounted on the rods 106, 107. A V-shaped bracket 108 is mounted on the plate 111 and extends upwardly through longitudinally-extending slots 113 in the top of table 10.

Support brackets 115 and 116 are screwed to the surface of the rods 106, 107 near the opposite ends thereof. The bottom walls of the bearing blocks 112, 114 are open to allow the blocks to move by the support brackets. The brackets 115, 116 are formed with journals 118, 119 at the lower ends thereof to pivotally receive shafts 120, 121, respectively, of the rod-elevating mechanisms 109, 110.

In the rod elevating mechanism 109, the shaft 120 is pivotally supported at each end by lever arms 123, 125. The lever arms 123, 124 are formed with hubs 125, 126, respectively, which are mounted on a shaft 127. The hubs 125, 126 are locked to shaft 127 by keys 129 positioned in keyways provided in the shaft and the hubs. Shaft 127 is journaled in bearings 130, 131 mounted in the frame plates 76, 77. The hubs 125, 126 carry second lever arms 132, 136, respectively, lever arm 132 being pivotally linked via a rod 134 to a lever arm 135 rigid with arm 95 (see FIG. 2).

In the rod elevating mechanism, 110, the shaft 121 is pivotally supported at each end by lever arms 138 and 139. The lever arms 138, 139 are formed with hubs 140, 141, respectively, which are mounted on a shaft 142. The hubs 140, 141 are locked to the shaft 142 by keys 144 positioned in appropriate keyways provided in the shaft and the hubs. The shaft 142 is journaled in bearings 145, 146 mounted in the frame plates 76, 77. The hub 141 carries a second lever arm 147 which is attached by means of a linkage rod 149 to the lever arm 136 of the rod elevating mechanism 109.

A rectangular frame 150 is mounted on the upper ends of the V-shaped bracket 108 to support the pusher plates 17, 18 and 19, 20. The frame 150 includes a pair of side members 151, each mounted on one end of the bracket 108, a first end member 152 and a second end member 154. The pusher plate 17, 18 are mounted on the end member 152 and the plates 19, 20 are mounted on the member 154.

The carriage 105 is interconnected to the carriage 45 of the pushing mechanism 13 by means of a pair of rods 155. The carriage 45 has a bracket 156 secured to its plate 56. The bracket 156 has a pair of upturned ears 157 to which the rods 155 are attached. The carriage 105 likewise has a bracket 159 secured to its plate 111. The bracket 159 has a pair of downturned ears 160 to which the other ends of the rods 155 are secured.

The rods 106 and 107 are raised and lowered by the operation of the rod 134. Rotation of the lever 132 clockwise rotates the shaft 127 and causes the shaft 142 to be rotated also in the clockwise direction. The rods 106 and 107 are thereby lowered. Rotation of the lever 132 counterclockwise causes counterclockwise rotation of the shafts 127 and 142 to raise the rods 106, 107.

When the output shaft 55 of the cam mechanism 54 rotates clockwise it causes the carriage 45 to be elevated while the carriage 105 is lowered. Counterclockwise rotation of the shaft 55 produces the opposite result, lowering the carriage 45 and raising the carriage 105.

Referring now to FIGS. 8 to 12, the first saw mechanism 11 includes two saw assemblies 161, 162 known as harps. Each of the harps 161, 162 includes a rectangular frame 164, 165 on which are mounted a series of saw blades 12 in spaced, parallel relationship. The frames 164, 165 have side members 166, 167, top members 169, 170, respectively, and bottom members 171, 172, respectively. The frames are mounted vertically in parallel relation to each other between vertical side plates 174, 175 extending upward from the frame plates 76, 77. Two pairs of channel-shaped tracks 176, 177 are mounted to the inwardly-facing surface of the plates 174, 175. Rollers 179, 180 mounted to the side members 166, 167 of the frames are seated in the tracks 176, 177. The top of the plates 174 and 175 are interconnected by bars 178. The bottom frame members 171, 172 are mounted on shafts 181, 182, respectively, by means of pairs of arms 184, 185, respectively. The arms 184, 185 are provided with bushings 186, 187, respectively, which are positioned on the shafts 181, 182.

The shafts 181, 182 are mounted on either side of a shaft 190 by means of a pair of levers 189 welded to the shaft 190. The shaft 190 is journaled in bearings 191, 192 mounted in the frame plates 76, 77 respectively. The shaft 190 is given a rocking motion by a crank mechanism 194, acting through a lever arm 195 welded to the shaft 190. The crank mechanism includes a crank wheel 196 driven by a V-belt pulley 197. A crank arm 199 connects the arm 195 to the wheel 196. The rocking motion of the shaft 190 simultaneously moves one of the harps upwardly and the other downwardly.

The saw blades 12 which are 0.015 inch in thickness and approximately 12 inches long, are mounted in a line between the frames 164, 165. Every other blade is carried by the frame 164 with the intervening blades carried by the frame 165. The upper ends of the blades are mounted to the frames by means of fingers 200 and 201 which extend from the upper frame members 169 and 170, respectively, toward each other into the space separating the two frames 164, 165. The lower ends of the blades are held by fin members 202, 203 extending in similar manner from the lower frame members 171, 172.

As shown in FIG. 10, blades 12 extend through slots 205 in the ends of rail extension members 206. The members 206 are aligned with the rails 100 and are mounted on a bar 207 extending between the frame plates. The free ends of the rails 100 and the members 206 are slanted as seen in FIG. 8 so that the ends of the rails 100 rest upon and are supported by the members 206.

Also shown in FIG. 10, is an opening 209 in the table top member 104 for receiving the edge trim scrap produced when the product stacks are sawn. A pair of wall members 210, 211 guide the edge scrap stirps into the opening 209 where they fall onto a scrap conveyor not shown.

To minimize the width of the cut made by each saw blade, a device 212 is mounted between the vertical side plates 174, 175 to prevent the blades from twisting and vibrating. The device 212 includes a bent metal bar 214 having a solid portion 215 extending downwardly at an angle from a supporting bar 216, and a notched end bar portion 217 which extends horizontally from the solid portion 215 past the saw blades 12 at a level somewhat above that of the product stack. As shown in FIG. 12, the end portion 217 has a wide rectangular notch 218 for each saw blade. Beneath the portion 217 there are two additional bars 219 and 220. These bars are provided with narrower notches 221 and 222, respectively. The notches 221, 222 are each formed with one wall 224, 225, which is bevelled at the mouth of the notch. The ends of the bars 219 and 220 are provided with elongated holes 226 and 227, respectively, which align with bolt holes 229 in the edges of the end bar portion 217. The notches 221,222 are positioned with respect to the holes 226, 227 so that the walls 224 of the bar 219 effectively narrow the notches 218 from one side, while the walls 225 of the bar 220 effectively narrow the notches 218 from the other side. The bars 219 and 220 are held in place by bolts 230 which extend through appropriate holes and are fitted with nuts (not shown) which bear against the bar 220. The elongated holes 226, 227 allow the bars 219 and 220 to be exactly adjusted to minimize vibration of the saw blades. As a result, the kerf of each blade 12 is from 0.015 to 0.020 inch wide.

As shown in FIGS. 3 and 13, the segments 31 and 32 of the conveyor 22 ride on supporting strips 231. At the second saw mechanism 35, each of the strips 231 are formed with vertically oriented passageways (not shown) for accommodating the saw blades of that saw mechanism. The mechanism 35 is essentially identical to the saw mechanism 11 except that one harp has only three blades and the other harp, only two.

The overhead conveyor 37, shown in FIGS. 1 and 13, includes a pair of frame plates 232 and 233, a pair of sprockets 235 mounted on a shaft 236 journaled in the plates 232 and 233, a pair of sprockets 237 mounted on a driven shaft 238, conveyor chains 239 mounted on the sprockets, and four pusher elements 240 carried by the chains 239.

The conveyor 37 slides the sawn products off the conveyor 22 and onto the dead plate 40 and into the path of the second overhead conveyor 41.

The conveyor 41 is also a chain conveyor in which the chains are driven by sprockets. The sprockets and chains are mounted between a pair of side plates 242 and 243, and the conveyor is fitted with L-shaped pusher blades 245 that extend out from between the side plates 242, 243 and then extend laterally along the dead plate 40. The side plate 242 is rounded at the ends to avoid the path of the lateral extension of the pusher blades 245 as they move around the sprockets.

As may be seen in FIG. 14, the pusher blades 245 move the product groupings along the dead plate 40 and deposit it on the conveyor 44 for delivery to a packaging station.

In operation, four waffle creme sandwich sheets are manually stacked at position A on the table 10. The rails 46, 47 are lowered (from the position shown in FIG. 2) by the counterclockwise rotation of the lever arm 95. The carriage 45 is then moved along the rails beneath the stack at position A by the clockwise rotation of the arm 99. The lever arm 95 rotates clockwise to lift the carriage 45 and the arm 99 rotates counterclockwise. The pusher fingers engage the stack and slide it along the rails 100 to position B.

On the next cycle of the carriage 45, the pusher fingers 15 move the stack through the saw mechanism 11 to the position C. The thin dividing wall 23 separates the stack into two substacks. From the position shown in FIG. 3, the carriage 105 is raised by the counterclockwise rotation of the arm 135 (as the carriage 45 is lowered). The carriage 105 is then moved to the right, by the motion of the carriage 45, placing the frame 150 above the sawn stack at position C. The carriage is then lowered and and moved to the left. The pusher plates 17 and 18 engage the two substacks and move them to position D. As the stacks move from position C to position D, the wedge 21 moves the substacks laterally away from each other. On the next cycle of operation, the plates 19 and 20 engage the substacks and move them from position D onto the conveyor 22.

The pusher elements 32 of the conveyor 22 are spaced along the length of the conveyor at a distance corresponding to one half the length of the original product sheets. The conveyor 22 is driven intermittently, moving the distance between pusher elements during each interval of motion. The conveyor 22 goes through two driving intervals while the pushing mechanisms 13 and 16 go through a single cycle. Therefore, there is an empty position on the conveyor 22 aligned with each of the pusher plates 19 and 20, each time those plates move toward the conveyor.

The overhead conveyors 37 and 41 also operate intermittently. Each time the conveyor 22 advances one position, the conveyor 37 slides the end product group on the conveyor 22 onto the dead plate 241 into the path of the offset pusher blades 245 of the conveyor 41. The conveyor 41 then moves one position depositing one product group onto the conveyor 44.

At the packaging station, each of the four parallel package-sized groups is manually pushed along a table top as a unit and slipped into a packaging conveyor bucket in one motion.

The narrow kerf of the saw blades reduces the total kerf on the first cut to between 0.285 and 0.138, from the total kerf of between 0.855 and 1.045 produced by the prior cut system. Therefore, the present invention produces the same size product pieces with blades that are positioned closer together to increase the size of the first cut trim strips by up to ⅛ inch each. On the second cut which produces five kerfs, the present invention adds about ⅛ inch to each trim strip. This amount, though small, is significant and has been shown to be sufficient since the loss of product pieces due to edge irregularity in the sandwich sheets has been effectively eliminated with the use of the present invention.

As a result the scrap generated by this improved system averages about 13% rather than the 20% scrap common with the prior art arrangement. In addition, substantial manual labor is eliminated in the cutting and packaging operations.

It will be seen from the foregoing that the present invention provides apparatus for sawing a stack of large baked sheets with reduced production scrap into pieces which are arranged in package-sized groups.

We claim:

1. Apparatus for sawing a stack of large baked sheets into a multitude of pieces arranged in package-sized groups comprising in combination: an elongated product supporting surface having input and output ends; a first saw mechanism positioned between said ends of said surface including a row of reciprocating saw blades extending through said surface; pusher means moveable to engage the product and slide it along said surface through said saw blades and off the output end of said surface; product transporting means positioned at the end of said surface for receiving and engaging the cut product to move the cut product in the direction perpendicular to the cut lines therein; and a second saw mechanism including a row of reciprocating saw blades extending across the path of the product carried by said transporting means to cut the product perpendicular to the first cut lines, said product transporting means including a longitudinally slotted conveyor comprising a plurality of longitudinally extending endless product-supporting members mounted for motion in a direction perpendicular to the cut lines in the cut product for carrying the cut product from the output end of said surface through the saw blades of said second saw mechanism, said product-supporting members being transversely spaced from each other to provide slots therebetween, said product transporting means further including pusher elements which engage the edges of the stacked sheets and pass between adjacent saw blades of said second saw mechanism during the sawing operations, said pusher elements being attached to said product-supporting members and positioned between said slots, said blades of said second saw mechansim extending through said slots.

2. Apparatus according to claim 1, wherein said pusher means include pusher elements which engage the edges of said stacked sheets and pass between adjacent saw blades of said first saw mechanism during the sawing operations.

3. Apparatus according to claim 2 wherein said supporting surface is provided with slots extending longitudinally from said input end toward said output end, and said pusher elements of said pusher means extend upwardly through said slots in said surface.

4. Apparatus according to claim 3 wherein said pusher means includes a first pushing mechanism for moving the stack of sheets through and past said first saw mechansim, and a second pushing mechanism for moving said stack off the output end of said surface, said pusher elements of said pusher means being part of said first pushing mechanism.

5. Apparatus according to claim 4 wherein said first pushing mechanism includes: a longitudinally-extending carriage support member beneath said surface; a carriage mounted to move along said support member; said pusher elements of said pusher means being mounted on said carriage and including a first set of pusher fingers mounted on one end of said carriage for moving the product stack from the input end of said surface to a position intermediate said input end and said first saw mechanism, and a second set of pusher fingers mounted on the other end of said carriage for moving the product stack from said intermediate position through and past said saw blades of said first saw mechanism; means for moving said carriage along said support member; and means for raising and lowering said carriage support member to move said pusher fingers through said slots between an extended position and a retracted position.

6. Apparatus according to claim 5, wherein said second pushing mechanism includes vertically oriented pusher plate means positioned above said surface.

7. Apparatus according to claim 6, including wedge means positioned on said surface between said first saw mechanism and said output end of said surface to split the sawed stack into spaced portions.

8. Apparatus according to claim 7, wherein said second pushing mechanism includes a second longitudinally extending carriage support member beneath said surface, a carriage mounted to move along said support member, frame means positioned above said surface and mounted on said carriage, and first pusher plate means mounted on one end of said frame means for moving the sawed stack from adjacent the first saw mechanism to said wedge means, and second pusher plate means mounted at the other end of said frame means for moving said spaced portions off the output end of said surface onto said conveyor.

9. Apparatus according to claim 1 including a dead plate adjacent said longitudinally slotted conveyor between the output end thereof and said second saw mechanism, first overhead conveyor means for sliding the doubly sawed stacks off said longitudinally slotted conveyor onto said dead plate, and belt conveyor passing beneath said dead plate, and a second overhead conveyor means for sliding the stacks off the dead plate onto said belt conveyor.

10. Apparatus for sawing a stack of large baked sheets into a multitide of pieces arranged in package-sized groups, comprising in combination:
an elongated product supporting surface having input and output ends;
a first saw mechanism positioned between said ends of said surface including a row of reciprocating saw blades extending through said surface;
pusher means moveable to engage the product and slide it along said surface through said saw blades and off the output end of said surface;
product transporting means positioned at the end of said surface for receiving and engaging the cut product to move the cut product in the direction perpendicular to the cut lines therein; and
a second saw mechanism including a row of reciprocating saw blades extending across the path of the product carried by said transporting means to cut the product perpendicular to the first cut lines, said pusher means including at last one pusher element oriented perpendicularly with respect to said surface for engaging the edges of a first stack of baked sheets to slide said first stack along said surface from a first position thereon to a second position thereon, said apparatus further comprising stack shifting means engageable with the product on said surface for moving a second stack of baked sheets into said first position during a shifting of said first stack from said first position to said second position by said pusher element, said pusher means including carriage means attached to said pusher element for shifting same in direction parallel to said surface and along a path between said input and output ends while maintaining said pusher element in an orientation perpendicular to said surface, said pusher means further including transverse shifting means supporting said carriage means for shifting said carriage means and said pusher element perpendicularly to said surface and said path prior to and after a stroke of said carriage means along said path while maintaining said pusher element in an orientation substantially perpendicular to said surface, said pusher means also including drive means operatively coupled to said carriage means and said transverse shifting means for operating same in alternation with one another.

11. Apparatus according to claim 10 wherein said carriage means incudes an elongate carriage support member extending substantially parallel to said path and a carriage shiftably mounted to said support member, said transverse shifting means being coupled to said carriage support member for shifting same in a direction perpendicular to said path and said surface.

12. Apparatus according to claim 11 wherein said stack shifting means includes an additional pusher element rigid with said carriage and disposed upstream of said one pusher element relative to the direction of motion of said first stack along said path, whereby said additional pusher element engages said second stack of baked sheets and slides same from a third position on said surface to said first position.

13. Apparatus according to claim 11 wherein said surface is provided with slots extending longitudinally from said input end to said output end, said one pusher element and said second pusher element including a first set of fingers and a second set of fingers, respectively, said fingers extending upwardly through said slots during a stroke of said carriage along said carriage support member, said carriage and said carriage support member being disposed below said surface, said transverse shifting means being operable for raising and lowering said carriage support member to move said fingers through said slots between an extended position and a retracted position.

14. Apparatus according to claim 10, 11, 12 or 13 wherein said one pusher element, said stack shifting means, said carriage means and said transverse shifting means comprise a first pushing mechanism for moving said first stack through and past said first saw mechanism, said pusher means including a second pushing mechanism for moving said second stack off the output end of said surface.

15. Apparatus according to claim 14 wherein said second pushing mechanism includes at least one pusher plate disposed above said surface and oriented substantially perpendicularly thereto, parallel shifting means coupled to said pusher plate for moving same in a dirction parallel to said surface, and additional transverse shifting means coupled to said parallel shifting means for moving same and said pusher plate in a direction perpendicular to said surface prior to and after a stroke of said pusher plate parallel to said surface, said drive means being operatively coupled to said parallel shifting means for operating same in tandem with said carriage means, said drive means being coupled to said additional transverse shifting means for operating said transverse shifting means in tandem with one another.

16. Apparatus for sawing a stack of large baked sheets into a multitude of pieces arranged in package-sized groups comprising in combination:

an elongated product supporting surface having input and output ends, said supporting surface being provided with slots extending longitudinally from said input end toward said output end;

a first saw mechanism positioned between said ends of said surface including a row of reciprocating saw blades extending through said surface;

pusher means including a first pushing mechanism for sliding the stack of sheets along said surface through and past said first saw mechanism and a second pushing mechanism for moving said stack off the output end of said surface, said first pushing mechanism including a longitudinally extending carriage support member beneath said surface and a carriage mounted to move along said support member, said pusher means including a first set of fingers mounted on one end of said carriage and extending upwardly through said slots in said surface for engaging the edges of the stacked sheets and moving the product stack from the input end of said surface to a position intermediate said input end and said first saw mechanism, and a second set of pusher fingers mounted on the other end of said carriage and extending upwardly through said slots in said surface for engaging the edges of the stacked sheets and moving the product stack from said intermediate position through and past said saw blades of said first saw mechanism, said second fingers passing between adjacent saw blades during the sawing operations, said pusher means further including shifting means for moving said carriage along said support member and drive means for raising and lowering said carriage support member to move said fingers through said slots between an extended position and a retracted position;

product transporting means positioned at the end of said surface for receiving and engaging the cut product to move the cut product in the direction perpendicular to the cut lines therein; and a second saw mechanism including a row of reciprocating saw blades extending across the path of the product carried by said transporting means to cut the product perpendicular to the first cut lines.

* * * * *